United States Patent

Abe et al.

[11] 3,884,533
[45] May 20, 1975

[54] FLUID PRESSURE REGULATOR VALVE AND SAFETY VALVE ASSEMBLY

[75] Inventors: Toshihiro Abe, Kawagoe; Kiyoshi Tokaiwa, Higashi-Matsuyama, both of Japan

[73] Assignee: Jidosha Kiki Kabushiki Kaisha, Tokyo, Japan

[22] Filed: July 11, 1973

[21] Appl. No.: 378,103

[30] Foreign Application Priority Data
July 11, 1972  Japan.............................. 47-069481

[52] U.S. Cl............ 303/84 A; 188/151 A; 303/6 R; 303/10
[51] Int. Cl............................................. B60t 17/22
[58] Field of Search............. 303/84 A, 84 R, 2, 85, 303/6 R, 6 C, 13, 10; 188/151 A, 152

[56] References Cited
UNITED STATES PATENTS

| | | | |
|---|---|---|---|
| 2,317,194 | 4/1943 | Humphrey | 303/85 |
| 2,992,652 | 7/1961 | Fellberg | 303/84 A |
| 3,393,018 | 7/1968 | Fites | 303/13 |
| 3,699,679 | 10/1972 | Bardos et al. | 303/84 A |

Primary Examiner—Trygve M. Blix
Assistant Examiner—D. C. Butler
Attorney, Agent, or Firm—Sughrue, Rothwell, Mion, Zinn & MacPeak

[57] ABSTRACT

A fluid pressure regulator valve assembly for the pressure accumulators used in the dual full pressure hydraulic brake system for vehicles is provided with two independent brake fluid conduits branching from a common supply passage and opened to both ends of a distributor cylinder. A pair of pressure chambers is provided in the distributor cylinder, mutually separated by a baffle wall, and communicate with a pair of accumulators. A piston rod slidably inserted through the baffle wall is kept at the neutral position by a balancing spring. A pair of one-way stop valves is provided at both open ends of passages of the pressure chambers, and each end of the piston rod is confronted with a valve element of each one-way stop valve.

The piston rod is actuated against the repelling force of the balancing spring while the pressure of the braking fluid in any one of the accumulators is reduced to the desired level to a direction for moving the valve element at the reduced pressure side and clogging the open ends of the passages of the pressure chambers.

4 Claims, 3 Drawing Figures

PATENTED MAY 20 1975  3,884,533

3,884,533

FLUID PRESSURE REGULATOR VALVE AND SAFETY VALVE ASSEMBLY

BACKGROUND OF THE INVENTION

1. Field of the Invention

This invention relates to a fluid pressure regulator valve assembly, and more particularly to a regulator valve assembly for pressure accumulators used in the dual full power hydraulic brake system for vehicles.

2. Description of the Prior Art

In the full power hydraulic systems, the hydraulic pressure supplied from an engine driven piston pump is generally accumulated in a pressure accumulator so that an actuation of a brake pedal connected to a brake control valve causes the introduction of the pressurized fluid to the wheel cylinders for stopping the rotation of the wheels. Accordingly, an amount of the fluid pressure sufficient to bring out the desired braking action but insufficient to damage the durability of the brake system is required to be always accumulated and held in the accumulator.

In the conventional hydraulic brake system having a single braking fluid conduit, however, a mechanical failure caused at any point of the system causes duely the effluence or escape of the braking fluid, thus resulting in the impossibility of the control of the brake system.

SUMMARY OF THE INVENTION

This invention is intended to produce an improved pressure regulator valve assembly to be used in the full power hydraulic brake system which is actuated reliably and safely by a pair of mutually independent braking fluid conduits branching from a common supply passage connected to a pressurized fluid source, so that the mechanical failure in any part of the brake conduits will not prevent the normal actuation of the remaining brake system.

Therefore, this invention provides an improved pressure regulator valve assembly for a dual full pressure hydraulic brake system, which comprises two independent brake fluid conduits branching from a common supply passage connected to the pressure fluid source, both said branched conduits being opened to both end parts of a distributor cylinder, a pair of pressure chambers mutually separated by a baffle wall in said distributor cylinder and communicating with a pair of accumulators, a piston rod inserted slidably through said baffle wall and kept at the neutral position by a balancing spring, and a pair of one-way stop valves provided at both open ends of passages of said pressure chambers, wherein each end of said piston rod is confronted with a valve element of each said one-way stop valve, and said piston rod is actuated against the force of the balanccing spring while the pressure of the braking fluid in any one of said accumulators is reduced to the desired level to a direction to move the valve element at the reduced pressure side and to clog the open end of the passage.

In accordance with such structure of the pressure regulator valve assembly; even if the circuit of one of said brake systems is damaged, the sound circuit of the rest of the brake systems assures the normal operation, as the piston rod of the distributor cylinder will shut off the damaged circuit in response to a difference between the fluid pressure in the sound brake conduit and that in the damaged brake conduit detected at both sides of the piston rod; besides, the leakage of the braking fluid from the damaged circuit is prevented and accordingly, the sticking of the piston pump is eliminated.

As the difference between the pressures in two said accumulators detected by the piston rod can be controlled by selecting the diameter of the piston rod and the spring constant of the balancing spring, the reliable braking force can be assured to prevent the unexpected accident.

DESCRIPTION OF THE PREFERRED EMBODIMENT

Figure 1:
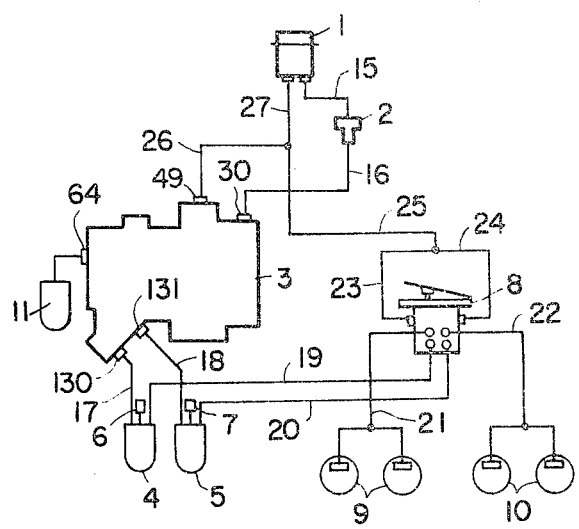
FIG. 1 is a diagram of a dual full power hydraulic brake system including a pressure regulator valve assembly, according to this invention.

The particular embodiments of this invention will be described with reference to accompanied drawings; a fluid reservoir 1 is provided for supplying hydraulic fluid through a low pressure rubber hose 15 to an engine driven piston pump 2. The output from the piston pump 2 is conducted through a high pressure flexible conduit 16 to a pressure regulator valve assembly 3, and further introduced into a pair of accumulators 4 and 5 through a pair of conduit 17 and 18, respectively, connected, via outlet ports 130 and 131 of the fluid pressure regulator valve. When the pressure of the braking fluid in the accumulators 4 and 5 reaches a desired high level, a releasing member in the fluid pressure regulator valve assembly hereinafter described is actuated to form a recirculation circuit, and the braking fluid supplied from the high pressure flexible conduit 16 flows from a discharge port 49 opened at upper side of the fluid pressure regulator valve assembly 3 to the resrvoir 1 through conduits 26 and 27. Pressure outlet conduits 19 and 20 direct the pressurized braking fluid in each of the accumulators 4 and 5 to a brake control valve 8. Upon application of a brake pedal on the brake control valve 8, the pressurized fluid is supplied through conduits 21 and 22 to front wheel brake cylinders 9, 9 and rear wheel brake cylinders 10, 10, respectively. Conduits 23, 24 and 25 communicate each discharge port of the brake control valve 8 to the reservoir 1 via a conduit 27. Pressure sensitive switches 6 and 7 provided on the accumulators 4 and 5, respectively, actuate an alarming device when the fluid pressures in the accumulators 4 and 5 fall below the predetermined value by the mechanical failure or other accident to alarm the operator that the running of the car is dangerous.

Figure 2:
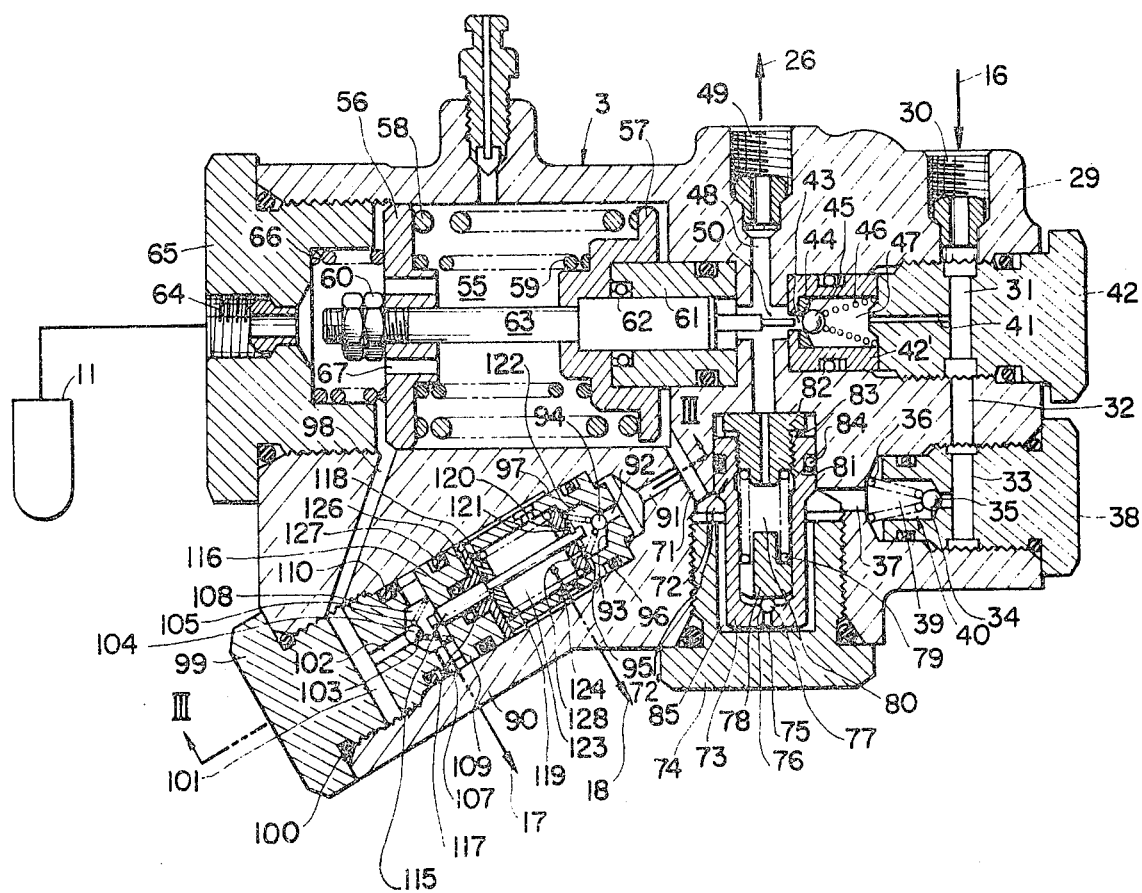
FIG. 2 is a cross section of said pressure regulator valve assembly.

The precise structure of the fluid pressure regulator valve assembly is shown in the FIG. 2. A valve housing 29 has an inlet port 30 at the upper side thereof. The supplying conduit 16 from the piston pump 2 is connected to the inlet port 30. This inlet port 30 communicates with a penetrating hole 31 of a shut-off plug 42 which is threaded into the valve housing 29 from one side thereof, and further with a vertical passage 32. The vertical passage 32 is also communicated in turn with a penetrating hole 33 of a stop valve plug 38 which is threaded into the lower part of the shut-off plug 42, a one-way stop valve 40 including a valve element 35 positioned on a valve seat 34 in a valve chamber 39 by a spring 36, and a passage 37 extending inwardly in the valve housing 29. A safety valve 72 is provided in the passage 72'. A large diameter cylinder bore 55 is communicated with the passage 37 via a passage 71.

Figure 3:
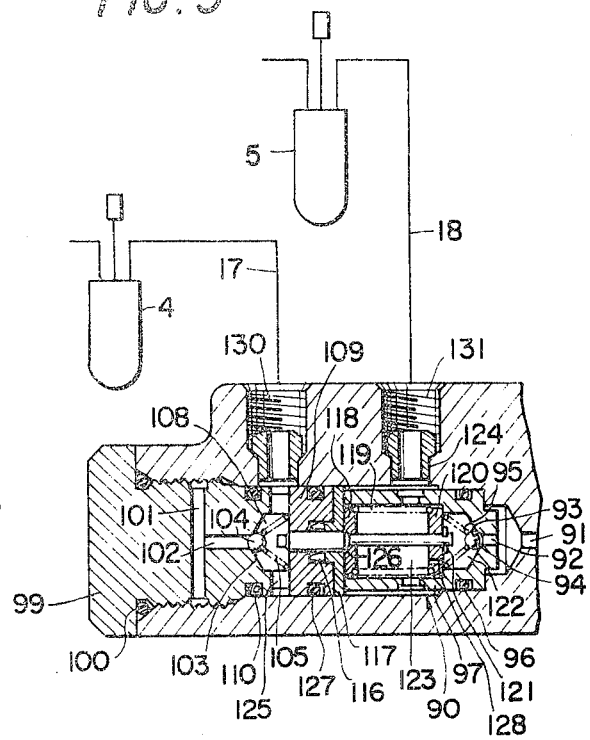
FIG. 3 is a cross section of a part of said pressure regulator valve assembly cut along III—III line in the FIG. 2.

The structure of a distributor cylinder 90 is shown in the FIG. 3, wherein a branch passage 91 from the passage 71 and a branch passage 98 from the left side of the large diameter cylinder bore 90, are connected to both ends of the distributor cylinder 90, respectively. A tube 97 is fixedly inserted into a right end of the distributor cylinder and includes therein a right pressure chamber 123 which is communicated with the accumulator 5 via a conduit 18 and with an outlet port 131 via a passage 124. A valve chamber 122 to which a passage 92 communicating with the passage 91 is connected is provided at the right end of the pressure chamber 123. A one-way stop valve or check valve whose valve element 94 is positioned on a valve seat 93 in the inner end of the passage 92 by a spring 95 is provided on said valve chamber 122. A shut-off plug 99 threaded fixedly into the left end of the distributor cylinder holds a supporting ring 117 and a baffle wall 109 together with the tube 97, and a penetrating passage 101 communicating with the branch passage 98 which is further communicated with the large diameter cylinder bore 55 is provided at the left screwed part of the shut-off plug. A passage 102 communicating concentrically with the passage 92 is connected to a valve chamber 108 in the left pressure chamber 125 which is formed in the inner end of the shut-off plug 99. A one-way stop valve or check valve whose valve element 104 is positioned on a valve sheet 103 at the inner end of the passage 102 by a spring 105 is provided in said valve chamber 108. A piston rod 115 penetrates through the baffle wall 109 and the supporting ring 117, and both ends of the piston rod having the small diameter are located adjacent the inner ends of the valve elements 94 and 104, respectively. A balancing spring 119 spans between an inner supporting piece 118 engaged with a shoulder part 126 at the inner end and an outer supporting member 120 held by a fixing ring 121 engaged in the groove at the outer end. The outer supporting piece 120 is engaged with a step part of the pressure chamber 123, and provided with a fluid passage 128 therein. An inner sealing member 116 surrounds the center zone of the large diameter part of the piston rod 115 and is fixed by engaging an annular projection of the supporting ring 117 with the center recess of the baffle wall 109. Sealing members 96 and 127 are provided at the tubing 97 and the baffle wall 109, respectively. Sealing members 100 and 110 are provided at the outer periphery of the shut-off plug 99.

The braking fluid supplied from the pump 2 into the inlet port 30 opens the valve element 35 of the stop valve 40, so that a flow of the braking fluid is conducted through the passage 71 and the branch passage 91 into the distributor cylinder 90 while another flow of the braking fluid is conducted through the passage 71, the large diameter cylinder bore 55 and the branch passage 98 into the distributor cylinder 90. The braking fluid delivered by the branch passage 91 passes through a passage 92, opens the valve element 94, and accumulates in the accumulator 5 through the valve chamber 122, the passage 128, the pressure chamber 123, the passage 124, the outlet port 131 and the conduit 18. On the other hand, the braking fluid from the branch 98 passes through the passages 101 and 102, opens the valve chamber 108, and to accumulate in the accumulator 4 via the valve chamber 108, the pressure chamber 125, the passage 107, the outlet port 130 and the conduit 17. In a case that one of the accumulators, for example the accumulator 5, is damaged and the fluid pressure there is abnormally reduced, the inner pressure in the rightward pressure chamber 123 is reduced to cause a pressure difference between the rightward pressure chamber 123 and the leftward pressure chamber 125. This pressure difference causes the piston rod 115 to move rightwards against the elastic force of a balancing spring 119, and to thrust the valve element 94 into the valve seat 93, thus blocking the passage 92 and preventing the flow of the braking fluid into the damaged accumulator 5. On the other hand, if the accumulator 4 is damaged and the fluid pressure therein is abnormally reduced, the inner pressure in the leftward pressure chamber 125 is reduced to cause the pressure difference between the rightward and leftward pressure chambers 123 and 125. This pressure difference causes the piston rod 115 to move leftwards against the force of the balancing spring 119 and to thrust the valve element 104 onto the valve seat 103, thus blocking the passage 102 and preventing the flow of the braking fluid into the damaged accumulator 4. In such cases, the introduction of the braking fluid into the second accumulator is not influenced by the damage of the other accumulator.

The return circuit of the braking fluid formed when the desired fluid pressure is accumulated in each of the accumulators 4 and 5 through the shut-off plug 42 provided below the inlet port 30 is described below. An orifice 41 is provided along the axis of the shut-off plug 42 to be communicated with the penetrating hole 31 of the latter. A tube 42' is fixedly inserted into the inner end of the plug 42. The orifice 41 is connected to the valve chamber 47 formed in the tube 42'. The outlet port 43 is provided at another end of the valve chamber 47. A valve element 45 is positioned on the valve seat 44, which is formed in the outlet port 43, by a spring 46. An internal passage 50 is provided between the outlet port 43 and a vertical passage 48 which communicates in turn with the discharge port 49 and the return conduits 26 and 27 leading to the reservoir 1, thus forming a recirculation circuit for excess fluid in conjunction with the orifice 41, the valve chamber 47 and the outlet port 43.

A large diameter cylinder bore 55 is formed as an axial extension of the internal passage 50, and serves as a connecting passage for the braking fluid supplying passages 71 and 98. The shut-off plug 65 is tightly screwed in the left end of the cylinder bore 55 and the outlet hole 64 of the plug 65 is connected to an auxiliary accumulator 11. Therefore, this auxiliary accumulator 11 is filled with the braking fluid during the accumulation of the latter in the accumulators 4 and 5, and actuated to balance the pressure difference between both accumulators 4 and 5. The tube 61 is inserted fixedly in the inner end of the cylinder bore 55. The releasing member 63 is slidably inserted in the tube 61 via the sealing member 62. The inner end of the releasing member extends through the inner passage 50 and the outlet port 43 to the valve element 45. An inner spring seat 57 is inserted into the projecting part of the tube 61 through the releasing member, and an outer spring seat 56 is inserted into the outer end of the releasing member 63. The springs 58 and 59 span between both spring seats 56 and 57, and the inner end of the releasing member 63 is kept apart from the valve element 45 by the elastic forces of the springs 58 and 59 which are adjusted by the adjusting nut 60. A suppressing spring 66 spans between the outer spring seat 56 and the inside end of the shut-off plug 65, and serves to prevent the loosening of the releasing member 63 and the tube 61 when the braking fluid pressure passing through the outlet hole 67 of the outer spring seat 56 is reduced with the reduction of the inner pressure of the accumulator.

Accordingly, when the fluid pressure in each of the accumulators 4 and 5 has reached a predetermined value, the fluid pressure in the cylindrical bore 55 overcomes the forces of the springs 58 and 59, and causes the releasing member 63 move rightwards to release the valve element 45 from the valve seat 44 and to form the recirculation circuit. Meanwhile, the stop valve or check valve 40 is closed by the pressure reduction at the side of the passage 33.

The safety valve 72 inserted in the feeding passage 31 has the following structure and function.

A plug 74 for the safety valve is threaded into the passage 37 through the lower part of the valve housing 29. An aperture 85 communicating with the passage 37 is formed between the safety plug and a valve housing 73 which is inserted into the latter with a seal 84. A valve element 77 is disposed on the valve seat 76 formed at the inside of the bottom inlet 75 of the valve housing 73.

A spring 79 spans between the floating member 78 for thrusting the valve element 77 and a plug 82 threaded into the upper end of the valve housing 73 via an adjusting ring 83 so as to position the valve element 77 on the valve seat 76 and to communicate a passage 81 formed on the plug 82 with the vertical passage 48. Accordingly, when the fluid pressure in the passage 37 is abnormally increased by the some reason without stop of the fluid accumulation in the accumulators 4 and 5, the valve element 77 is detached from the valve seat 76 against the force of the spring, thus causing feed back of the braking fluid to the reservoir 1 through the passage 37, the aperture 85, the bottom inlet 75, the inner chamber 80 of the valve housing 73, the passage 81 and the vertical passage 48. This feed back circuit prevents the damage of the pipings and instruments of the brake system.

The operations of the dual full power brake pressure control system utilizng the pressure regulator valve assembly of this invention will be described. At the start of the operation of the brake system no liquid under pressure is accumulated in the accumulators 4 and 5 and the auxiliary accumulator 11. Accordingly, the fluid pressure is not applied to the cylinder bore 55, so that the releasing member 63 is detached from the valve seat 45 by the elastic force of the springs 58 and 59. This valve element is positioned on the valve seat 44 to clog the recirculation circuit through the orifice 41 and the discharge port 49. Therefore, the braking fluid passed through the reservoir 1 and the conduit 15 and generated from the piston pump 2 flows through the conduit 16, the inlet port 30 of the fluid pressure regulator valve 3, the penetrating hole 31, the vertical passage 32, the penetrating hole 33, the passage 37 as opening the valve element 35 of the stop valve 40, and the passage 71. One of the branch flows further passes through the branch passage 91 and is introduced into one end of the distributor cylinder 90, while another branched flow passes through the large diameter cylinder bore 55, the branched passage 98 and another end of the distributor cylinder 90. Thus, the two braking fluid flows open the valve elements 94 and 104, and fluid under pressure is accumulated in the accumulators 4 and 5 and the auxiliary accumulator 11 through both pressure chambers 123 and 125.

Meanwhile, the fluid pressures in the leftward and rightward pressure chambers 123 and 125 act on the piston rod 115 in mutually inverse directions, so that both said fluid pressure are kept balanced without acutating the balancing spring 119.

When the inner pressure of the large diameter cylinder bore 55 has reached to the predetermined value as the progress of the accumulation, the releasing member 63 moves rightwards against the force of the spring 58 and 59 to detach the valve element 45 from the valve seat 44. Accordingly, a recirculation circuit is formed through the pump 2, the inlet port 30, the penetrating hole 31, the orifice 41, the valve chamber 47, the outlet port 43, the internal passage 50, the vertical passage 48, the discharge port 49, the conduits 26 and 27, and the reservoir 1. The pump 2 is operated substantially without load neglecting the resistance of the pipings.

Meanwhile, the fluid pressure in the vertical passage 32 and that in the penetrating hole 33 is reduced to zero, but the inner pressures in the passage 37, 71 and in the large diameter cylinder bore 55 are kept at the predetermined value due to the closing of the stop valve 40. The pressure in the accumulators 4 and 5 is also kept at the predetermined value blocking of the valve elements 94 and 104. When the pedal of the brake control valve 8 is depressed, a part of the pressurized fluid in the accumulators 4 and 5 is supplied through the conduit 21 and 22 to the front and rear brake cylinders 9 and 10 to generate the braking force proportion to the pressure applied to the pedal. Upon releasing the pedal, the pressurized fluids in the brake cylinders 9 and 10 are returned from the discharge port of the brake control valve 8 through the conduits 23, 24, 25 and 27 to the reservoir 1. If the pressures in the accumulators 4 and 5 are reduced by the repeating of the braking operations, the inner pressure of the large diameter bore 55 is reduced together with that of the auxiliary accumulators 11. When the pressure drops have reached the predetermined value, the releasing member 63 returns to the left by the forces of the springs 58 and 59, thus returning the valve element 45 on the valve seat and blocking the recirculation circuit through the orifice 41. Accordingly, the braking fluid supplied from the pump 2 to the inlet port 30 is again accumulated in the accumulators 4 and 5. The stop and start of the braking fluid accumulation are repeated successively.

If a mechanical failure occurs in any point in the front wheel brake system including the accumulator 4 and the brake cylinder 9 and an abrupt decrease of the pressure in the accumulator is caused, the inner pressure of the leftward pressure chamber 125 is simultaneously reduced to move the piston rod 115 leftwards against the elastic force of the balancing spring 119. Accordingly, the valve element 104 is thrusted and seated mechanically on the valve seat 103 to prevent the braking fluid in the large diameter cylinder bore 55 flowing through the passages 98, 101 and 102 into the leftward pressure chamber 125. Accordingly, the output of the pump is never fed into the accumulator 4 to prevent the escape of the braking fluid through the damaged part of the front wheel brake system.

On the other hand, if any part of the rear wheel braking system including the accumulator 5 and the brake cylinder 10 is damaged and the pressure in the accumulator 5 is abruptly decreased, the inner pressure of the rightward pressure chamber 123 is simultaneously reduced to move the piston rod 115 rightwards against the force of the balancing spring 119. Accordingly, the valve element 94 is thrusted and sealed on the valve seat 93 to block the passage 92, thus preventing the accumulation of the pump output into the accumulator 5 and the effluence of the braking fluid from the damaged part of the rear wheel brake system.

If any one of the front and rear brake system becomes damaged and impossible to operate due to the reduction of the fluid pressure, and pressure difference is caused between the leftward pressure chamber 125 and the rightward pressure chamber 123 of the distributor cylinder 90 to actuate the piston rod 115, thus thrusting the valve elements 94 or 104 on the valve seats thereof and clogging the flowing passage to the distributor cylinder 90. The pressure in the brake system is thereby kept at the normal level. As the piston rod 115 is moved against the force of the balancing spring 119, the floating of the piston rod 115 due to the pressure difference between the accumulators 4 and 5 during the brake operation can be prevented and the pressure difference during the piston movement can be determined to the desired value by selecting the elastic force of the balancing spring 119 and the diameter of the piston rod 115.

The auxiliary accumulator 11 serves to absorb the pulsive pressure generated in the large diameter cylinder bore 55 and to balance the pressure difference between the accumulators 4 and 5 caused by the difference between the braking fluid consumption of the front wheel braking cylinder 9 and that of the rear wheel braking cylinder 10 during the brake application. When the pressure in the accumulators 4 and 5 is reduced below the predetermined value, the pressure sensitive switches 6 and 7 (shown in the FIG. 1) are actuated to give the alarm that the running of the car becomes dangerous. When an accident occurs within the fluid pressure regulator valve assembly 3 and the output of the pump 2 is not made without load thereby to elevate the inner pressure of the accumulators 4 and 5 over the predetermined value, the safety valve 72 is actuated to release the excess pressure as described above.

As particularly described above, the pressure regulating valve assembly of this invention assures and keeps the braking capability of the remained braking system notwithstanding a mechanical defect in either of two said conduits of the braking system and also eliminates substancially the leakage of the braking fluid from the braking system.

While this invention has been described with reference to particular embodiments thereof, it will be understood that the numerous modification may be made by those skilled in the art without actually departing from the scope of this invention.

Therefore, the appended claim is intended to cover all such equivalent variations as coming within the true spirit and scope of the invention.

What is claimed is:

1. A fluid pressure regulating valve assembly for a dual, full pressure hydraulic brake system including independent brake fluid conduits branching from a common supply passage connected to a source of pressurized fluid, said assembly including a valve body, said supply passage and said two brake fluid conduits being coupled to said body, fluid accumulators coupled to said two fluid conduits downstream of said valve body, said valve body including fluid passages (91, 92 and 98, 102), for dividing the flow of fluid from said supply passage into two branches feeding said two conduits respectively, said valve body further including a distributing cylinder (90) including a wall (109) forming two separate pressure chambers (123, 125) on respective sides thereof, means connecting said fluid passages (91, 92) to one of said chambers and said fluid passages (98, 102) to said other chamber, and means fluidly coupling said chambers to said independent brake fluid conduits, a piston rod (115) slidably mounted within said partition (109), a balance spring mounted within said distributing cylinder and acting on said piston rod to maintain said piston rod in axial neutral position with the opposite ends of the piston rod being in respective pressure chambers (123,125), check valves (94,104) fluidly connecting said passages (92,102) respectively with pressure chambers (123 and 125) for normally permitting fluid flow from said passages into said chambers, and the ends of said piston rods being face to face with said check valves such that shifting of said piston rod in response to loss of pressure within one of said chambers causes said piston rod to maintain the check valve within that chamber closed to prevent loss of pressurized fluid to the brake fluid conduit and the accumulator connected thereto.

2. The fluid pressure regulating valve assembly as claimed in claim 1, wherein the check valves (94, 104) provided within passages (92, 102) of cylinder (90) effect the prevention of reverse flow from the accumulator when the common power source to the common supply passage becomes ineffective and wherein the balance spring prevents pressurized fluid from flowing from said common supply passage to the independent brake fluid conduit suffering a break when the pressure difference between both circuits becomes larger than a predetermined value due to breakdown of one of said circuits.

3. The fluid pressure regulating valve assembly as claimed in claim 2, wherein said valve body includes a cylindrical bore defining said distributor cylinder, a tube (97) is fixedly carried within one end of said distributor cylinder (90) and forms one of said pressure chambers (123), said wall comprising a disc-like baffle wall positioned within said distributor cylinder to the side of said tube (97) and forms with said distributing cylinder the second pressure chamber (125), said piston rod (115) includes an enlarged diameter portion slidably carried within the center of said partition (109), said balance spring (119) concentrically surrounds a portion of said piston rod (115) within said tube (97) and acts on said rod to maintain said piston rod (115) such that its ends are spaced from respective check valves (94, 104) in response to equal pressures within respective chambers (123, 125).

4. The fluid pressure regulating valve assembly as claimed in claim 1, wherein said valve body includes a fluid pressure feedback passage (48) fluid connected to a reservoir which functions as a source of pressurized fluid, said valve body further including; an enlarged bore portion acting as a continuation of said feedback passage, means fluid connecting said enlarged bore (85) to said supply passage, a valve housing (73) within said enlarged bore including an axial inlet leading from said enlarged bore to axial chamber within said valve housing (73), a spring biased valve element (77) disposed within said chamber and biased into valve closed position overlying said inlet (75), and means fluid connecting said chamber to said feedback passage, whereby when fluid pressure in said supply passage is abnormally increased without cessation of fluid accumulation in said accumulators (4, 5), said valve element (77) opens against said bias to feedback braking fluid and prevents damage to the independent brake fluid conduits and the brake system.

* * * * *

UNITED STATES PATENT OFFICE
CERTIFICATE OF CORRECTION

PATENT NO. : 3,884,533
DATED : May 20, 1975
INVENTOR(S) : Toshihiro Abe and Kiyoshi Takaiwa It is certified that error appears in the above-identified patent and that said Letters Patent are hereby corrected as shown below:

Please change the spelling of the name of the inventor

Kiyoshi Tokaiwa to ---- Kiyoshi Takaiwa ---- as correctly signed in both the declaration and assignment.

Signed and Sealed this ninth Day of December 1975

[SEAL]

Attest:

RUTH C. MASON
*Attesting Officer*

C. MARSHALL DANN
*Commissioner of Patents and Trademarks*